UNITED STATES PATENT OFFICE.

MARK SHOELD, OF CHICAGO, ILLINOIS, ASSIGNOR TO ARMOUR FERTILIZER WORKS, OF CHICAGO, ILLINOIS, A CORPORATION OF NEW JERSEY.

PRODUCTION OF ALUMINUM CHLORID.

1,375,116.   Specification of Letters Patent.   Patented Apr. 19, 1921.

No Drawing.   Application filed November 5, 1920.   Serial No. 421,849.

*To all whom it may concern:*

Be it known that I, MARK SHOELD, a citizen of the United States, residing at Chicago, in the county of Cook and State of Illinois, have invented certain new and useful Improvements in the Production of Aluminum Chlorid, of which the following is a specification.

Aluminum chlorid can be advantageously employed in the so-called "cracking" of heavy oils, in the production of organic compounds, in the manufacture of dye stuffs, and in several other ways.

It is important, therefore, to be able to produce it on a large scale at small cost and by some relatively simple process which does not have objectionable characteristics.

It has been made on a small or laboratory scale by subjecting heated aluminum to the action of chlorin gas, or by the heating of a mixture of aluminum oxid and carbon in a current of chlorin, the carbon and chlorin by their mutual, rather than by their separate, action effecting the chemical transformation in consequence of the affinity of carbon for oxygen and of chlorin for aluminum.

In the case of the use of alumina and carbon, the process is not economical because it is not distinctly exothermic, and consequently external heating is resorted to.

Nor is the method economical wherein metal aluminum is employed because the production of the aluminum itself is a relatively expensive electrolytic process, and also for the reason that the metal fuses into a lump rendering its surface only available for the reaction.

Neither are either of these processes commercially feasible since chlorin at the required temperature is a disagreeable gas to use and is a violent or active reagent consuming parts of the apparatus when outside heat has to be resorted to.

Accordingly the prime purpose of my invention is the provision of a process or method for the manufacture of aluminum chlorid on a large or commercial scale which is not subject to the objections stated and which may be practised at small cost, the use of the comparatively-expensive metal aluminum to any great extent being avoided.

A further object of the invention is to make the process definitely exothermic hence avoiding the outside heating with its detrimental features particularly in a process employing chlorin gas.

In conformity with this new process, briquets of suitable size and shape, and consisting of approximately 70 per cent. by weight of finely-divided pure or impure alumina, about 30 per cent. of carbon in a similar condition as to size, and an appropriate binder, such as the waste sulfite liquor from paper plants, having been dried in the usual manner, are calcined in any approved manner, preferably, however, in any suitable resistance-type of electric-furnace for a period of about four to six hours at a temperature of substantially 1600 degrees to 2000 degrees centigrade, 1800 degrees being a fair average.

The purpose of such calcination is to render the briquets completely anhydrous or to eliminate or remove every trace of hydrate water. If the temperature is too low a trace of hydrate water will remain, and such a condition is not permissible according to this process. Even at a temperature of 1000 degrees to 1200 degrees centigrade it is impossible to remove all traces of hydrate-water from the alumina when the process is practised on a large scale. On the other hand, if the temperature is too high the briquets will fuse more or less and the chlorin gas subsequently used can attack only their surfaces rendering the reaction incomplete and the method uneconomical. The assurance that the briquets are completely anhydrous after such calcination is important as the presence of a vestige or trace of hydrate water is sufficient to disturb or ruin the subsequent reaction with the chlorin, and the aluminum chlorid produced would not be anhydrous, resulting in trouble in handling and shipping the product. If the chlorid is completely anhydrous, it may satisfactorily be transported in metal containers, but if any moisture is present, there is a likelihood of corrosion and the formation of gas.

During such calcination there may or may not be a slight chemical transformation of the alumina to a sub-oxid or other chemical reaction may occur. At present I am not certain whether or not such an occurrence takes place. It is to be noted, however, that no carbid is produced by the calcining action because the briquets do not contain a sufficient amount of carbon to produce a carbid, only enough carbon being present in the briquets to form carbon monoxid in the next step of the process.

In the commercial practice of the subsequent steps in the method, a cylindrical shaft or tube, of about twelve inches in diameter and approximately four feet in height and suitably lined with fire-brick, is internally heated in any approved manner, as by the burning of gas, until it becomes quite hot. The calcined anhydrous briquets are introduced into such furnace or shaft either after or before the heating operation. When the shaft has become sufficiently heated, the source of heat, such as the gas referred to and its air, are shut off or discontinued, and the chlorin gas is introduced and caused to flow through the body or charge of briquets.

The aluminum oxid in the presence of the carbon and chlorin and under the proper temperature produces anhydrous aluminum chlorid and carbon monoxid, this reaction being slightly exothermic. Such desired result, however, cannot be satisfactorily accomplished unless every trace of water has been eliminated from the briquets. The chemical change takes place substantially instantaneously and the reaction can be easily governed by controlling the speed of admission or introduction of the chlorin gas, only enough of which enters for the reaction, no excess being employed. The process thus once well begun or inaugurated may be practised continuously by the proper introduction of briquets at the top of the shaft and the withdrawal of the material reacted upon from the bottom of the shaft during the operation, the aluminum chlorid being sublimed and recovered in a sublimation chamber.

The temperature of the material in the shaft is unknown, but is probably about 600 degrees to 900 degrees centigrade.

While it is not essential, nevertheless in many cases it is desirable, to increase the heat of the reaction thus rendering the process more distinctly exothermic, and this outcome or result is secured by mixing with the briquets, prior to their introduction into the shaft, of about 5 per cent. by weight of aluminum skimmings constituting waste aluminum metal in finely divided form. Thus the exothermic heat developed by the union of the aluminum metal with the chlorin gas renders the whole process more desirably and economically exothermic.

It will be apparent to those skilled in this art that this invention is not necessarily restricted to the exact and precise features of the process detailed above, since the method may be varied more or less without departure from the substance and essence of the invention and without the sacrifice of any of its substantial benefits and advantages, and, accordingly, the appended claims are intended to cover all equivalents falling within their scope, for example, instead of using chlorin gas direct, in some cases, it may be advisable to employ any suitable chemical or chemicals which at the temperature used, gives off or generates the chlorin gas.

I claim:

1. The process of producing aluminum chlorid consisting in heating alumina to a temperature of approximately 1600 to 2000 degrees centigrade for a period of time to render it substantially completely anhydrous and then subjecting it in the presence of carbon to the action of chlorin, substantially as described.

2. The process of producing aluminum chlorid consisting in preparing briquets containing finely divided alumina and carbon, heating the briquets to a temperature of approximately 1600 degrees to 2000 degrees centigrade for a period of time sufficient to render them substantially completely anhydrous, and then subjecting such briquets to the action of chlorin gas, substantially as described.

3. The process of producing aluminum chlorid consisting in forming briquets of finely divided alumina and carbon in the approximate proportions by weight of 70 per cent. alumina and 30 per cent. carbon, heating such briquets to a temperature of approximately 1600 degrees to 2000 degrees centigrade for a period of time sufficient to render the briquets substantially completely anhydrous, and then subjecting such briquets to the action of chlorin gas, substantially as described.

4. The process of producing aluminum chlorid consisting in preparing briquets containing alumina and carbon, rendering the briquets substantially completely anhydrous by heating them for a suitable period of time at a temperature of approximately 1600 degrees to 2000 degrees centigrade, subjecting such anhydrous briquets to the action of chlorin gas, initiating the reaction with the chlorin by heat other than that of the reaction, and depending upon the heat of the exothermic reaction for the continuance of the process, substantially as described.

5. The process of producing aluminum chlorid consisting in forming briquets of finely divided alumina and carbon in the approximate proportions by weight of 70 per cent. alumina and 30 per cent. carbon, heating the briquets to a temperature of approximately 1600 degrees to 2000 degrees centigrade for a period of time sufficient to render the briquets substantially completely anhydrous, then subjecting such briquets to the action of chlorin gas at a temperature of from 600 degrees to 900 degrees centigrade, initiating the reaction with the chlorin by outside heat, and depending upon the heat of the exothermic reaction for the continuance of the process, substantially as described.

6. The process of producing aluminum chlorid consisting in preparing briquets containing finely divided alumina and carbon, rendering the briquets substantially completely anhydrous by heating them for a suitable period of time at a temperature of approximately 1600 degrees to 2000 degrees centigrade, and subjecting such anhydrous briquets to the action of chlorin gas in the presence of metallic aluminum, substantially as described.

7. The process of producing aluminum chlorid consisting in preparing briquets containing alumina and carbon, rendering the briquets substantially completely anhydrous by heating them for a suitable period of time at a temperature of approximately 1600 degrees to 2000 degrees centigrade, subjecting such anhydrous briquets to the action of chlorin gas in the presence of metallic aluminum, initiating the reaction with the chlorin gas by heat other than that of the reaction, and depending upon the heat of the exothermic reaction for the continuance of the process, substantially as described.

8. The process of producing aluminum chlorid consisting in forming briquets of finely divided alumina and carbon in the approximate proportions by weight of 70 per cent. alumina and 30 per cent. carbon, heating such briquets to a temperature of approximately 1600 degrees to 2000 degrees centigrade for a period sufficient to render the briquets substantially completely anhydrous, subjecting such anhydrous briquets to the action of chlorin gas in the presence of metallic aluminum at a temperature of from about 600 degrees to 900 degrees centigrade, initiating the reaction with the chlorin gas by outside heat, and depending upon the heat of the exothermic reaction for the continuance of the process, substantially as described.

MARK SHOELD.